(12) United States Patent
Gao et al.

(10) Patent No.: US 10,364,907 B2
(45) Date of Patent: Jul. 30, 2019

(54) VALVE BODY STRUCTURE FACILITATING MAINTENANCE OF HOSE

(71) Applicant: Guangzhou Seagull Kitchen And Bath Products Co., Ltd, Guangzhou (CN)

(72) Inventors: Shuqi Gao, Guangzhou (CN);
Qianfeng Peng, Guangzhou (CN);
Mingzi Zhang, Guangzhou (CN);
Kunhua Zhong, Guangzhou (CN)

(73) Assignee: GUANGZHOU SEAGULL KITCHEN AND BATH PRODUCTS CO., LTD., Guangzhou (CN)

( * ) Notice: Subject to any disclaimer, the term of this patent is extended or adjusted under 35 U.S.C. 154(b) by 129 days.

(21) Appl. No.: 15/644,580

(22) Filed: Jul. 7, 2017

(65) Prior Publication Data
US 2018/0328511 A1    Nov. 15, 2018

(30) Foreign Application Priority Data

May 9, 2017   (CN) .................. 2017 1 0321895 2
May 9, 2017   (CN) .................. 2017 2 0508513 2 U

(51) Int. Cl.
| | | |
|---|---|---|
| *F16K 43/00* | (2006.01) | |
| *F16K 27/02* | (2006.01) | |
| *F16K 7/04* | (2006.01) | |
| *E03C 1/04* | (2006.01) | |
| *F16L 37/084* | (2006.01) | |
| *F16L 37/56* | (2006.01) | |

(52) U.S. Cl.
CPC ........ *F16K 27/0236* (2013.01); *E03C 1/0403* (2013.01); *F16K 7/04* (2013.01); *F16L 37/0841* (2013.01); *F16L 37/56* (2013.01)

(58) Field of Classification Search
CPC .... E03C 1/0403; F16K 27/00; F16L 37/0841; F16L 37/565
See application file for complete search history.

(56) References Cited

U.S. PATENT DOCUMENTS

| 4,186,761 A * | 2/1980 | Guarnieri ............ E03C 1/0401 137/315.15 |
|---|---|---|
| 5,558,128 A * | 9/1996 | Pawelzik ............ E03C 1/0403 137/359 |

(Continued)

*Primary Examiner* — Reinaldo Sanchez-Medina
(74) *Attorney, Agent, or Firm* — CBM Patent Consulting, LLC

(57) ABSTRACT

The present invention discloses a valve body structure facilitating maintenance of hose solving problem that prior valve body structure is inconvenient to install hose and unremovable. Valve body structure comprises hollow valve body, valve body provided with at least one water guide channel; hose inserted one end into valve body and connected with water guide channel, outer surface of one end of hose connected with water guide channel provided with clamping slot; clamping ring provided inside of valve body, which is located on the same plane as clamping slot, and one end of clamping ring provided with an elastic body which drives a clamping ring arm to locate in clamping slot and to clamp hose, if hose needs to be removed, compressing elastic body to move clamping ring arm away from clamping slot. The valve body structure facilitates user to repair or replace hose, and greatly saves user's maintenance costs.

8 Claims, 6 Drawing Sheets

(56) References Cited

U.S. PATENT DOCUMENTS

| | | | |
|---|---|---|---|
| 6,442,776 B1* | 9/2002 | Oberdorfer | E03C 1/0403 137/359 |
| 7,828,013 B2* | 11/2010 | Lin | E03C 1/0401 137/801 |
| 8,646,476 B2* | 2/2014 | Thomas | E03C 1/04 137/119.04 |
| 2009/0189108 A1* | 7/2009 | Ritter | E03C 1/0403 251/304 |
| 2012/0097279 A1* | 4/2012 | Ko | E03C 1/04 137/801 |

* cited by examiner

VALVE BODY STRUCTURE FACILITATING MAINTENANCE OF HOSE

This application claims priority to Chinese Patent Application Ser. No. CN2017103218952 and CN 2017205085132 filed 9 May 2017.

TECHNICAL FIELD

The present invention belongs to the field of a valve body, in particular to a valve body structure facilitating maintenance of a hose.

BACKGROUND

In the daily life and markets, we have seen a variety of valve body structure, but most of them are copper valve body or plastic valve body, and a water inlet hose and a water outlet hose connected to the valve body structure are coated of thread glue. Therefore, the hose is difficult to install, and when the hose or the valve body appears water leakage, the valve body can not be disassembled for maintenance, only the entire valve body are replaced, which greatly increases user's maintenance costs. In order to occupy markets, and achieve benefits, manufacturers can only change shape or perform surface treatment, but most of products are convergent. There is no difference, and can not meet the needs of users to achieve market benefits.

DESCRIPTION

In view of drawbacks of the prior art, the present invention provides a valve body structure facilitating maintenance of hose, which is used to solve the problem that the valve body structure of the prior art is inconvenient to install the hose, can not be disassembled for maintenance, and can only be replaced as a whole.

The technical solution provided by the invention is:

A valve body structure facilitating maintenance of hose, comprising:

A valve body being a hollow valve body, and the valve body provided with at least one water guide channel;

A hose inserted one end into the valve body and connected with the water guide channel, wherein the outer surface of one end of the hose connected with the water guide channel is provided with a clamping slot;

A clamping ring provided inside of the valve body, which is located on the same plane as the clamping slot of the hose, and one end of the clamping ring provided with an elastic body which drives a clamping ring arm of the clamping ring to locate in the clamping slot of the hose and to clamp the hose, and if the hose needs to be removed, compressing the elastic body to move the clamping ring arm of the clamping ring away from the clamping slot of the hose.

Preferably, the valve body structure facilitating maintenance of hose, wherein the valve body is further provided with a first through hole for pasing through a maintenance tool, the longitudinal axial direction of the first through hole being parallel to the longitudinal axial direction of the hose, and the first through hole being located in the lower end of the other end of the clamping ring opposite the elastic body, when the maintenance tool passes through the first through hole, abutting against the other end of the clamping ring to compress the elastic body.

Preferably, the valve body structure facilitating maintenance of hose, wherein the clamping ring is integrally formed with the elastic body or is a divided structur which is connected to each other.

Preferably, the valve body structure facilitating maintenance of hose, wherein the valve body is provided with a first water guide channel and a second water guide channel, the hose including a first hose and a second hose, one end of the first hose being inserted into the valve body and connected with the first water guide channel, one end of the second hose being inserted into the valve body and connected with the second water guide channel, and one end of the first hose and one end of the second hose being provided with a clamping slot, the clamping ring arm of the clamping ring including symmetrical a first clamping ring arm and a second clamping ring arm, the first clamping ring arm for clamping the first hose, the second clamping ring arm for clamping the second hose, and when the maintenance tool passes through the first through hole, abuts the other end of the clamping ring to compress the elastic body, the first clamping ring arm being away from the clamping slot of the first hose, and the second clamping ring arm being away from the clamping slot of the second hose.

Preferably, the valve body structure facilitating maintenance of hose, wherein the clamping ring is arranged inside of the valve body, and the specific providing method is that the side wall of the valve body is provided with an opening for inserting the clamping ring and the elastic body.

Preferably, the valve body structure facilitating maintenance of hose also comprises a sleeve and a valve body base, the valve body being inserted into the inside of the sleeve, the sleeve being mounted on the valve body base.

Preferably, the valve body structure facilitating maintenance of hose, wherein the valve body is inserted into the inside of the sleeve, and the specific providing method is that two grooves are symmetrically provided at one end portion of the sleeve, and a projection corresponding to two grooves is provided at the outer surface of one end of a position of the valve body away from the clamping ring, and the projection is clipped into the groove when the valve body is inserted into the sleeve.

Preferably, the valve body structure facilitating maintenance of hose wherein the outer surface of one end of the position of the valve body remote from the clamping ring is provided with a thread, and the projection is provided at border between the thread and non-thread of the valve body.

Preferably, the valve body structure facilitating maintenance of hose, wherein the valve body base is provided with a second through hole through which the sleeve is mounted on the valve body base.

The present invention includes at least the following advantageous effects: because of providing a clamping ring inside of the valve body, and an elastic body at one end of the clamping ring, the clamping ring moving back and forth under elastic force of the elastic body, when a clamping ring arm of the clamping ring locates in the clamping slot of the hose under elastic force drive of the elastic body, the clamping ring clamping the hose so that it can not be pulled out; when the hose needs to be maintained, compressing the elastic body, then the clamping ring arm of the clamping ring away from the clamping slot of the hose, the hose capable of removing. Therefore, the valve body structure facilitates the user to maintain or replace the hose, is not replaced with the entire valve body together, and greatly saves the user's maintenance costs.

Other advantages, objects, and features of the invention will be showed in part through following description, and in part will be understood by those skilled in the art from study and practice of the invention.

DETAILED DESCRIPTION

Figure 1:
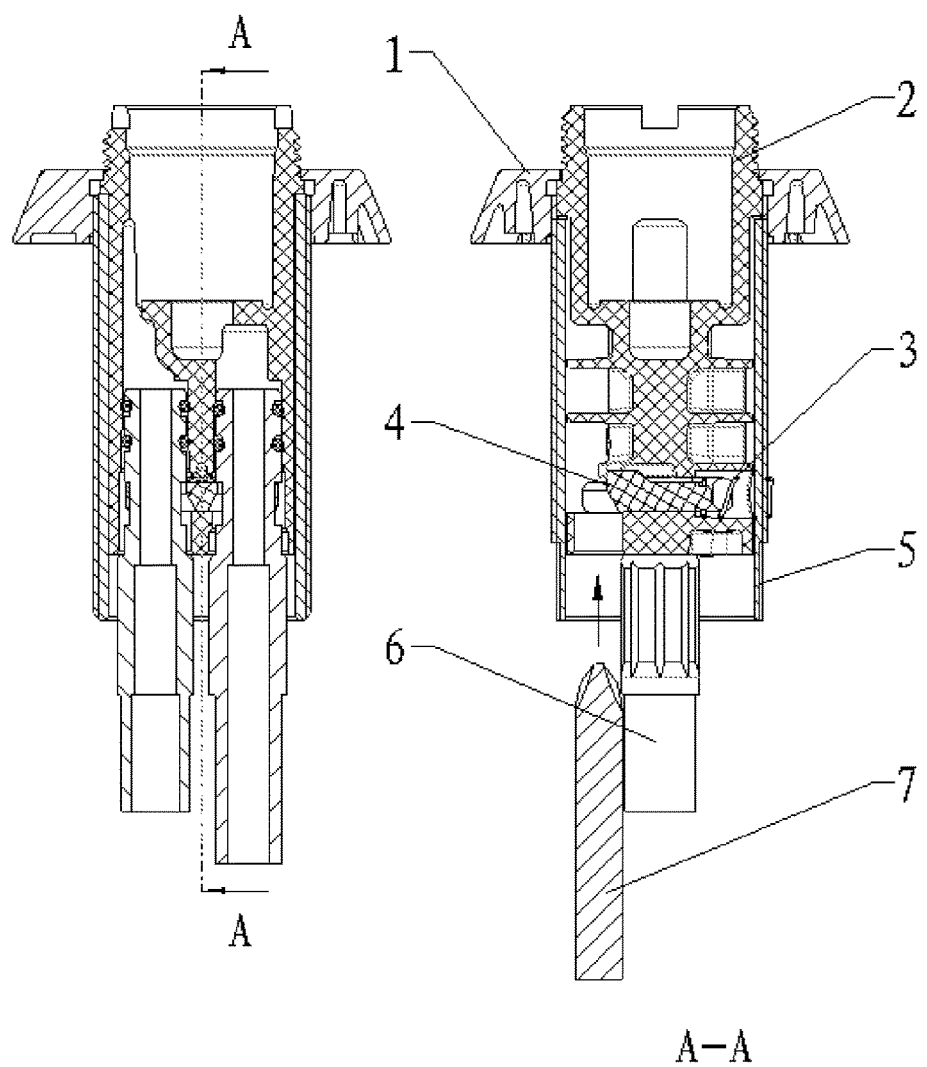
FIG. 1 is a front view of the valve body structure facilitating maintenance of hose according to the present invention.

The technical solution of the present invention will now be described clearly and completely with reference to the accompanying drawings in the embodiments, and it will be apparent that the described embodiments are merely part of the embodiments of the invention and are not intended to be exhaustive. All other embodiments obtained by those of ordinary skill in the art without making creative work are within the scope of the present invention based on embodiments in the present invention.

The present invention will now be described in further detail with reference to the accompanying drawings as required:

As shown in FIG. 1-6, the embodiment of the present invention provides a valve body structure facilitating maintenance of hose, comprising: a valve body 2 is a hollow valve body, and the valve body 2 is provided with at least one water guide channel. A hose 6 is inserted one end into the valve body 2 and connected with the water guide channel. The outer surface of one end of the hose connected with the water guide channel is provided with a clamping slot. A clamping ring 4 is provided inside of the valve body 2, which is located on the same plane as the clamping slot of the hose 6, and one end of the clamping ring is provided with an elastic body 3 which drives a clamping ring arm of the clamping ring 4 to locate in the clamping slot of the hose 6 and to clamp the hose 6. If the hose 6 needs to be removed, compressing the elastic body to move the clamping ring arm of the clamping ring away from the clamping slot of the hose.

Wherein the clamping ring is integrally formed with the elastic body or is a divided structur which is connected to each other.

Because of providing the clamping ring inside of the valve body, and the elastic body at one end of the clamping ring, the clamping ring moving back and forth under elastic force of the elastic body. When a clamping ring arm of the clamping ring locates in the clamping slot of the hose under elastic force drive of the elastic body, the clamping ring can clamp the hose so that it can not be pulled out. When the hose needs to be maintained, compressing the elastic body, then the clamping ring arm of the clamping ring is away from the clamping slot of the hose, and the hose can be removed. Therefore, the valve body structure facilitates the user to maintain or replace the hose, is not replaced with the entire valve body together, and greatly saves the user's maintenance costs.

It should be noted that the elastic body may be a spring or other elastic member. The present embodiment is not particularly limited and may be provided according to the actual situation. The clamping slot may be a circular clamping slot or may be other shapes depending on the shape of the hose. The present embodiment is not particularly limited and may be provided depending on the actual situation.

In order to facilitate providing the clamping ring and the elastic body inside the valve body, an openning for inserting the clamping ring and the elastic body is provided on the side wall of the valve body. Inserting the clamping ring and the elastic body into the valve body from the openning for inserting the clamping ring and the elastic body, and then compressing the elastic body, inserting the hose into the valve body, and after restoring the elastic body. The clamping ring arm of the clamping ring locates in the clamping slot of the hose under elastic force drive of the elastic body, and clamps the hose.

In order to facilitate compression of the elastic body, a preferable embodiment way of the present embodiment is: the valve body 2 is further provided with a first through hole for pasing through a maintenance tool 7. The longitudinal axial direction of the first through hole is parallel to the longitudinal axial direction of the hose, and the first through hole is located in the lower end of the other end of the clamping ring opposite the elastic body. When the maintenance tool passes through the first through hole, abutting against the other end of the clamping ring to compress the elastic body.

For the maintenance tool passing through the first through hole, abutting against the other end of the clamping ring to compress the elastic body, specific providing method can be a variety of ways to achieve. The present embodiment is not particularly limited, and one of the embodiments is shown below. One end of the maintenance tool for passing through the through hole is slope and has at least ½ cross-sectional area of the through hole not be covered by the clamping ring. When the maintenance tool passes through the through hole, and abuts against the other end of the clamping ring to compress the elastic body. A first through hole is provided at the other end of the clamping ring opposite to the elastic body, and a small portion of the first through hole is covered by the clamping ring. When the slope end of the maintenance tool is continuously inserted into the valve body from the first through hole, portion of which is not covered by the clamping ring, the maintenance tool abuts against the other end of the clamping ring so that the clamping ring moves toward the side of the elastic body. The elastic body is compressed while the clamping ring is moved, and the clamping ring arm of the clamping ring is slowly away from the clamping slot of the hose. When the first through hole is not completely covered by the clamping ring, the clamping ring and the elastic body are in a stationary state. When the clamping ring arm has been away from the clamping slot of the hose, the hose can be pulled out, and can be easily maintained or replaced.

Another embodiment way of the present embodiment is: the valve body 2 is provided with a first water guide channel and a second water guide channel. The hose includes a first hose and a second hose. One end of the first hose is inserted into the valve body and connected with the first water guide channel. One end of the second hose is inserted into the valve body and connected with the second water guide channel, and one end of the first hose and one end of the second hose are provided with a clamping slot. The clamping ring arm of the clamping ring includes symmetrical a first clamping ring arm and a second clamping ring arm, the first clamping ring arm for clamping the first hose, the second clamping ring arm for clamping the second hose. When the maintenance tool passes through the first through hole, and abuts the other end of the clamping ring to compress the elastic body, the first clamping ring arm is away from the clamping slot of the first hose, and the second clamping ring arm is away from the clamping slot of the second hose.

The clamping ring provided inside the valve body has two clamping ring arms, which are easy and quick to clamp two hoses simultaneously. The use of the two hoses can be set according to actual situation, can be same as outlet pipes or same as the inlet pipes, and can also be one of inlet pipe, the other for outlet pipe. Since the valve body is a hollow valve body, two opennings for the hose are provided at the same time as one end of the valve body. Since the longitudinal axial direction of the first through hole for passing through of the maintenance tool is parallel to the longitudinal axial direction of the hose, and the first through hole and the hose are provided at the same end of the valve body. One end of the valve body is provided with three opennings, two of which are inserted for the hose, and one of which are inserted for the maintenance tool.

Figure 2:
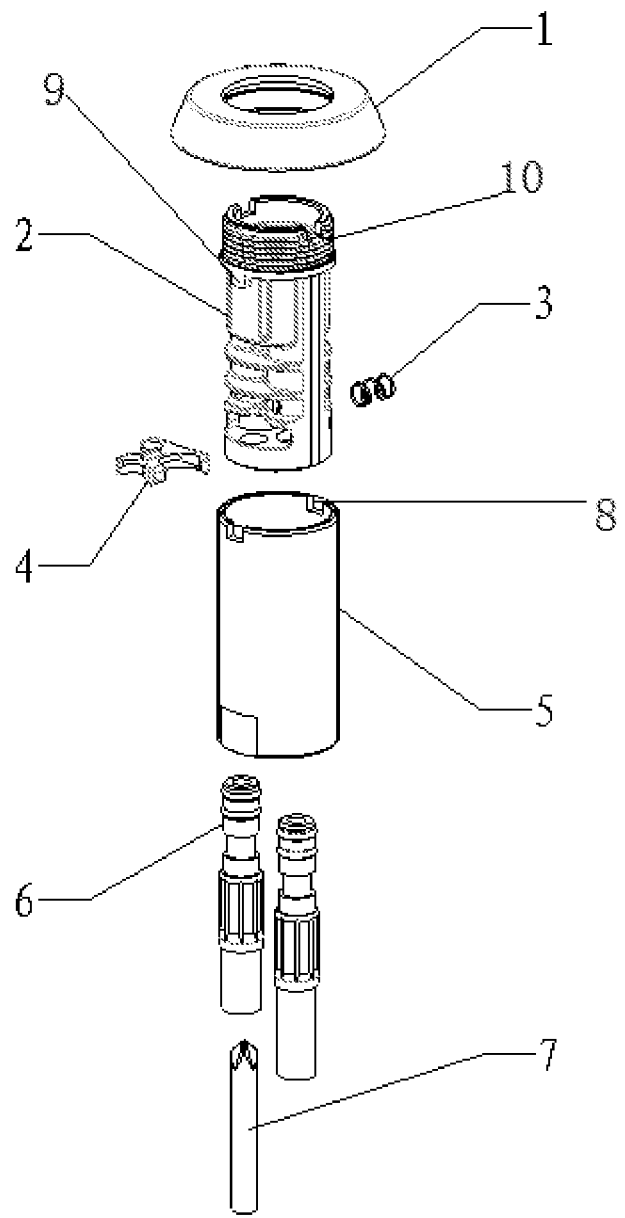
FIG. 2 is a assembled exploded view of the valve body structure facilitating maintenance of hose according to the present invention.
Figure 3:
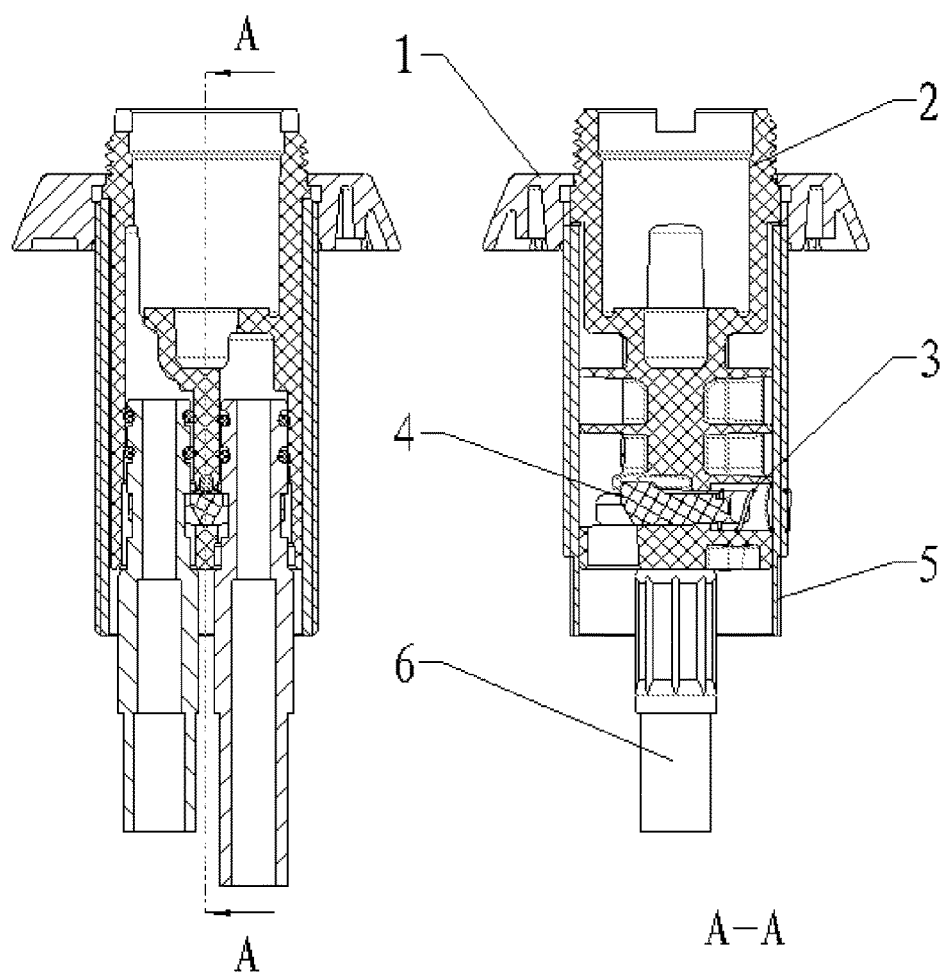
FIG. 3 is a front view of the valve body structure facilitating maintenance of hose without maintenance tool according to the present invention.
Figure 4:
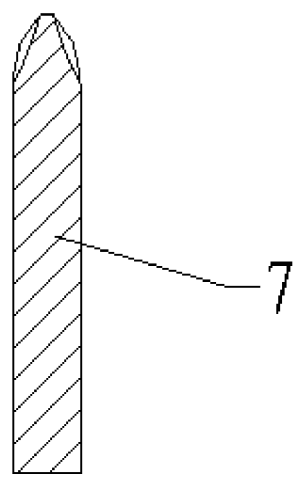
FIG. 4 is a front view of the maintenance tool of the valve body structure facilitating maintenance of hose according to the present invention.
Figure 5:
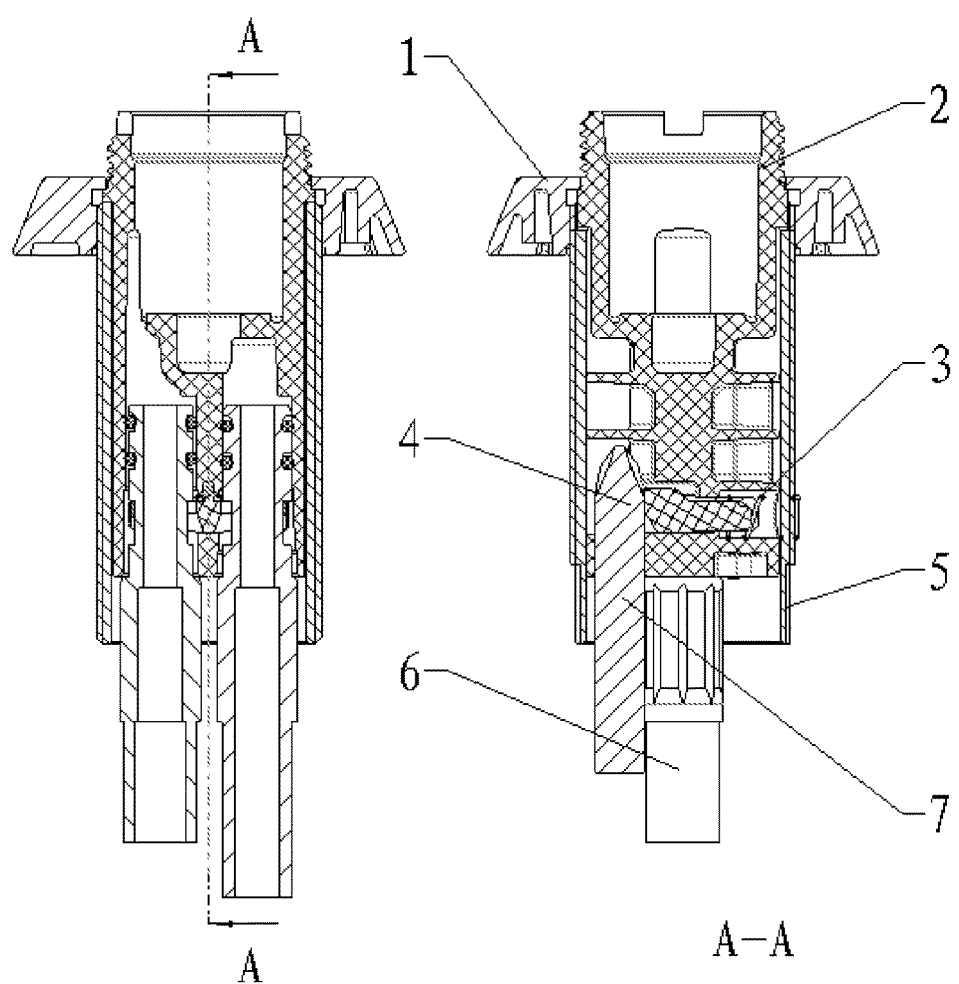
FIG. 5 is a front view of maintenance status of the valve body structure facilitating maintenance of hose according to the present invention.
Figure 6:
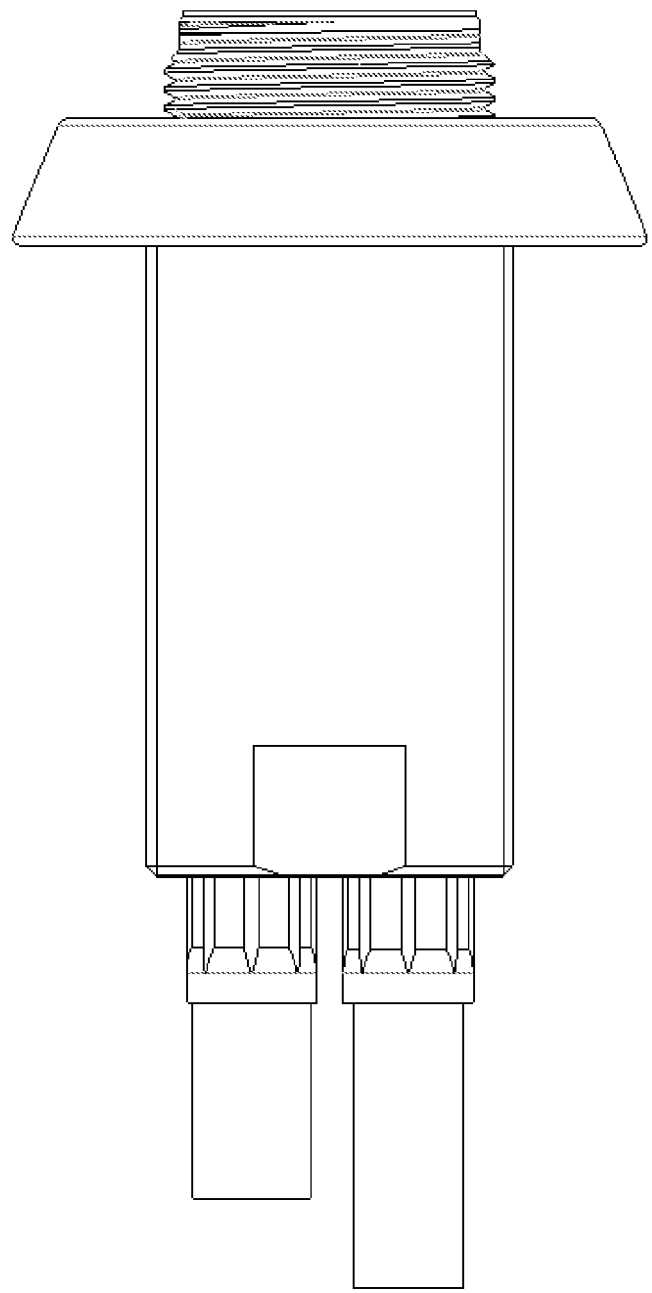
FIG. 6 is a design view of the valve body structure facilitating maintenance of hose according to the present invention.

It should be noted that the clamping ring has specific shape as shown in FIG. 2. The two clamping ring arms are symmetrically provided two semicircular shapes. The end of the clamping ring provided on the side of the through hole is also semi-circular. But the shape of the clamping ring is not limited to this, and may be other shapes. Such as two clamping ring arms are two symmetrically provided circular shapes, and the end of the clamping ring provided on the side of the through hole may be semicircular, may also be a straight line. As long as it is possible to realize the function of the clamping ring of the present embodiment.

Another embodiment way of the present embodiment is: the valve body structure also comprises a sleeve 5 and a valve body base 1. The valve body 2 is inserted into the inside of the sleeve 5, and the sleeve 5 is mounted on the valve body base 1. Wherein the valve body 2 is inserted into the inside of the sleeve 2, and the specific providing method is that two grooves 8 are symmetrically provided at one end portion of the sleeve, and a projection 9 corresponding to two grooves 8 is provided at the outer surface of one end of a position of the valve body 2 away from the clamping ring, and the projection 9 is clipped into the groove 8 when the valve body 2 is inserted into the sleeve 5.

In the present embodiment, the clamping ring and the elastic body are inserted into the valve body, the valve body is inserted into the inside of the sleeve, and the hose is inserted into the valve body. If the clamping ring and the elastic body are inserted into the valve body, the plane of the clamping ring and the elastic body and the plane of openning for inserting the clamping ring and the elastic body are located on the same plane. When the valve body is inserted into the sleeve, two ends of the clamping ring and the elastic body need to press and then insert into the sleeve together with the valve body. If the clamping ring and the elastic body are inserted into the valve body, the plane of the clamping ring and the elastic body and the plane of openning for inserting the clamping ring and the elastic body are not located on the same plane. Because the side of the valve body can play a fixing the clamping ring and the elastic body, the valve body can be directly inserted into the sleeve.

Further, the outer surface of one end of the position of the valve body 2 remote from the clamping ring 4 is provided with a thread 10, and the projection 9 is provided at border between the thread and non-thread of the valve body.

Futher, the valve body base is provided with a second through hole through which the sleeve is mounted on the valve body base.

For the valve body base, the specific shape of the present embodiment is not particularly limited and may be provided in accordance with actual situation. Hereinafter, a specific embodiment thereof is given, and when providing, the valve body base is annular, The outer diameter of the upper end face ring of the valve body base is smaller than the outer diameter of the lower end face ring of the valve body base. The sleeve passes through the ring of the valve body base to be arranged at the valve body base. The annular inner surface of the valve body base is provided with a thread adapted to the thread on the outer surface of the valve body, and the length of the thread on the outer surface of the valve body is larger than that of the length of the thread on the annular inner surface of the valve body base for exposing the thread on the outer surface of the valve body to the valve body base for fixing the valve body to the other assembly.

The process of installing the valve body is that the clamping ring and the elastic body are first inserted into the valve body through the openning on the side wall of the valve body, and then the both ends of the clamping ring and the elastic body are pressed, and together with the valve body are inserted into the sleeve so that the projection on the outer surface of the valve body is inserted into the groove in the end of the sleeve, and the assembled sleeve is mounted on the valve body base, and finally the maintenance tool is inserted into the first through hole. The two hoses are inserted into the valve body, and the maintenance tool is drawn out the first through hole. Under the action of the elastic body, the hose of the clamping slot is clamped by the springback clamping ring, and the hose can not be pulled out.

Although the embodiments of the present invention have been disclosed above, they are not limited to the applications previously mentioned in the specification and embodiments, and can be applied in various fields suitable for the present invention. For ordinary skilled person in the field, other various changed model, formula and parameter may be easily achieved without creative work according to instruction of the present invention, changed, modified and replaced embodiments without departing the general concept defined by the claims and their equivalent are still included in the present invention. The present invention is not limited to particular details and illustrations shown and described herein.

What is claimed is:

1. A valve body structure for facilitating maintenance of a hose, being characterized in that, comprises:
   a valve body being a hollow valve body, and the valve body provided with at least one water guide channel;
   the hose inserted one end into the valve body and connected with the water guide channel, wherein outer surface of one end of the hose connected with the water guide channel is provided with a clamping slot;
   a clamping ring provided inside of the valve body, which is located on the same plane as the clamping slot of the hose, and one end of the clamping ring provided with an elastic body which drives a clamping ring arm of the clamping ring to locate in the clamping slot of the hose and to clamp the hose, and if the hose needs to be removed, compressing the elastic body to move the clamping ring arm of the clamping ring away from the clamping slot of the hose;

wherein the valve body is further provided with a first through hole for passing through a maintenance tool, the longitudinal axial direction of the first through hole is parallel to the longitudinal axial direction of the hose, and the first through hole is located in lower end of other end of the clamping ring opposite the elastic body, when the maintenance tool passes through the first through hole, abutting against the other end of the clamping ring to compress the elastic body.

2. The valve body structure according to claim 1, being characterized in that, the clamping ring is integrally formed with the elastic body or is a divided structure which is connected to each other.

3. The valve body structure according to claim 2, being characterized in that, the valve body is provided with a first water guide channel and a second water guide channel, the hose including a first hose and a second hose, one end of the first hose being inserted into the valve body and connected with the first water guide channel, one end of the second hose being inserted into the valve body and connected with the second water guide channel, and another end of the first hose and another end of the second hose being provided with a clamping slot, the clamping ring arm of the clamping ring including symmetrical a first clamping ring arm and a second clamping ring arm, the first clamping ring arm for clamping the first hose, the second clamping ring arm for clamping the second hose, and when the maintenance tool passes through the first through hole, and abuts the other end of the clamping ring to compress the elastic body, the first clamping ring arm being away from the clamping slot of the first hose, and the second clamping ring arm being away from the clamping slot of the second hose.

4. The valve body structure according to claim 1, being characterized in that, the clamping ring is arranged inside of the valve body, and the side wall of the valve body is provided with an opening for inserting the clamping ring and the elastic body.

5. The valve body structure according to claim 4, being characterized in that, also comprises a sleeve and a valve body base, the valve body being inserted into the inside of the sleeve, the sleeve being mounted on the valve body base.

6. The valve body structure according to claim 5, being characterized in that, the valve body is inserted into the inside of the sleeve, and two grooves are symmetrically provided at one end portion of the sleeve, and a projection corresponding to two grooves is provided at outer surface of one end of the valve body away from the clamping ring, and the projection being clipped into the groove when the valve body is inserted into the sleeve.

7. The valve body structure according to claim 6, being characterized in that, the outer surface of one end of the valve body remote from the clamping ring is provided with a thread, and the projection is provided at a border between the thread and non-thread of the valve body.

8. The valve body structure according to claim 7, being characterized in that, the valve body base is provided with a second through hole through which the sleeve is mounted on the valve body base.

* * * * *